July 11, 1961  D. S. GREY ET AL  2,991,690
STEREOSCOPIC LENS-PRISM OPTICAL SYSTEM
Filed Sept. 4, 1953  5 Sheets-Sheet 1

INVENTORS
David S. Grey
Edwin H. Land
and
William N. Ryan
BY Brown and Mikulka
and
Moncure B. Berg
ATTORNEYS July 11, 1961

D. S. GREY ET AL 2,991,690

STEREOSCOPIC LENS-PRISM OPTICAL SYSTEM

Filed Sept. 4, 1953

INVENTORS
David S. Grey
Edwin H. Land
and
William N. Ryan

BY Brown and Mikulka
and
Moncure B. Berg
ATTORNEYS f/4            Focal Length 100

| ELEMENT | RADIUS | Spacing & Thickness | $N_D$ | V |
|---|---|---|---|---|
| I | $R_1 = +64.5$<br>$R_2 = -153.8$ | $t_1 = 7.0$<br>$d_1 = 10.9$ | 1.66 | 35.7 |
| II | $R_3 = -32.95$<br>$R_4 = +65.36$ | $t_2 = 4.0$<br>$d_2 = 2.33$ | 1.59 | 39.0 |
| III | $R_5 = +76.90$<br>$R_6 = +33.33$ | $t_3 = 3.0$ | 1.611 | 37.0 |
| IV | $R_7 = +33.33$<br>$R_8 = -31.33$ | $t_4 = 6.0$<br>$d_3 = 1.0$ | 1.611 | 58.8 |
| $P_1$ | | $t_5 = 109.0$<br>$d_4 = 16.6$ | 1.617 | 49.8 |

*f*/4          Focal Length 100

| ELEMENT | RADIUS | Spacing & Thickness | $N_D$ | V |
|---|---|---|---|---|
| V | $R_9 = +62.5$<br>$R_{10} = -250.00$ | $t_6 = 5.0$<br>$d_5 = 14.675$ | 1.65 | 38.4 |
| VI | $R_{11} = -32.575$<br>$R_{12} = +48.775$ | $t_7 = 2.0$<br>$d_6 = 3.0$ | 1.621 | 36.2 |
| VII | $R_{13} = +105.275$<br>$R_{14} = +52.625$ | $t_8 = 2.0$ | 1.617 | 36.6 |
| VIII | $R_{15} = +52.625$<br>$R_{16} = -31.475$ | $t_9 = 7.0$ | 1.611 | 58.8 |
| $P_2$ | | $t_{10} = 111.0$<br>$d_7 = 17.0$ | 1.617 | 53.9 |

INVENTORS
David S. Grey
Edwin H. Land
William H. Ryan
BY Brown and Mikulka
and Moncure B. Berg
ATTORNEYS July 11, 1961

D. S. GREY ET AL 2,991,690

STEREOSCOPIC LENS-PRISM OPTICAL SYSTEM

Filed Sept. 4, 1953

$f/3.5$                                                        Focal Length 100

| ELEMENT | RADIUS | Spacing & Thickness | $N_D$ | V |
|---|---|---|---|---|
| IX | $R_{17} = +78.125$<br>$R_{18} = -517.0$ | $t_{11} = 5.26$<br>$d_8 = 14.67$ | 1.8804 | 41.1 |
| X | $R_{19} = -34.01$<br>$R_{20} = +51.04$ | $t_{12} = 2.0$<br>$d_9 = 3.0$ | 1.649 | 33.8 |
| XI | $R_{21} = +105.3$<br>$R_{22} = -30.55$ | $t_{13} = 9.0$ | 1.611 | 58.8 |
| $P_3$ | | $t_{14} = 111.0$<br>$d_{10} = 16.8$ | 1.6109 | 57.2 |

INVENTORS
David S. Grey
Edwin H. Land
and
William H. Ryan

BY Brown and Mikulka
and
Moncure B. Berg
ATTORNEYS

United States Patent Office 2,991,690
Patented July 11, 1961

2,991,690
STEREOSCOPIC LENS-PRISM OPTICAL SYSTEM
David S. Grey, Weston, and Edwin H. Land and William H. Ryan, Cambridge, Mass., assignors to Polaroid Corporation, Cambridge, Mass., a corporation of Delaware
Filed Sept. 4, 1953, Ser. No. 378,618
3 Claims. (Cl. 88—16.6)

This invention relates to optical systems which employ lens means and prism means in combination with each other and particularly has reference to systems of this nature which are useful in carrying out stereoscopic image formation.

Objects of the invention are to provide a corrected optical system employing lens means for imaging an object in an image plane and light-reflecting means in conjunction therewith whereby to form said image within a predetermined area in said image plane and especially to carry out light reflections in such systems with prism means having a light path length therethrough which is greater than the focal length of the lens means; to provide a system of the character described comprising two prism elements which are designed to present a compact structure and which are secured together as a unit and are formed of the same optical material; and to provide prism units which are arranged in a compact prism structure designed to carry out two total internal reflections of light transmitted therethrough while minimizing undesired effects from light falsely transmitted or reflected in undesired paths.

Other objects of the invention are to provide a prism block formed of two prism units of the character described which are arranged so as to direct light from substantially the entire field onto predetermined areas in the image plane of said system, as for example, successive image frame areas of a photographic film, and especially to provide a prism block comprising a first prism unit and a second prism unit each having a first prism element provided with an entrance face, a reflecting face and an exit face which is secured to a second prism element also having an entrance face, a reflecting face and an exit face, and wherein each second prism element has as one of its faces a substantial plane boundary surface defined by an edge of the reflecting face and the exit face thereof and providing means for mounting said prism units in juxtaposed relation to form said block.

Further objects of the invention are to provide stereoscopic systems, particularly for use with a camera but also available for image projection, and especially systems which utilize a small stereoscopic interpupillary distance; and to provide, in a stereoscopic camera, optical means adapted to simultaneously produce one image of a stereoscopic image pair in each of a pair of adjacent image frame areas of a photographic film which is positioned in the film plane of the camera and which has said frame areas located in succession lengthwise of said film, and particularly to provide optical means employing a pair of lens-prism systems of the character heretofore set forth as comprising an objective lens and a prism unit, the objective lenses being positioned in spaced relation so that a plane containing their respective optical axes is substantially perpendicular to the film plane of the camera and so that the axes of the lenses themselves are substantially perpendicular to the film plane.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 3:
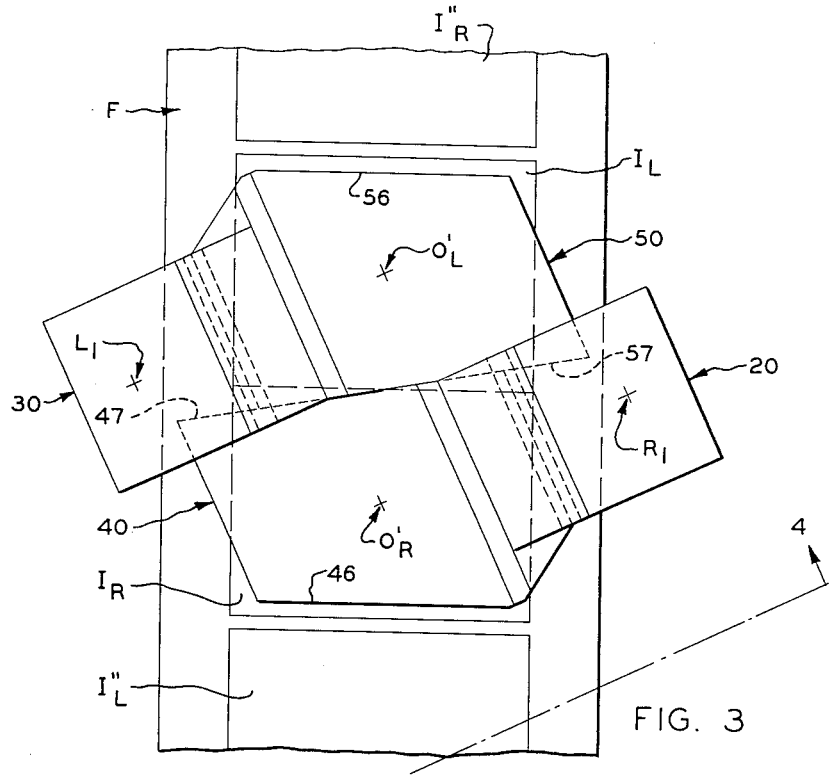
FIG. 3 shows one embodiment of a prism block as viewed from a plane parallel to the film and schematically illustrates the film.
Figure 4:
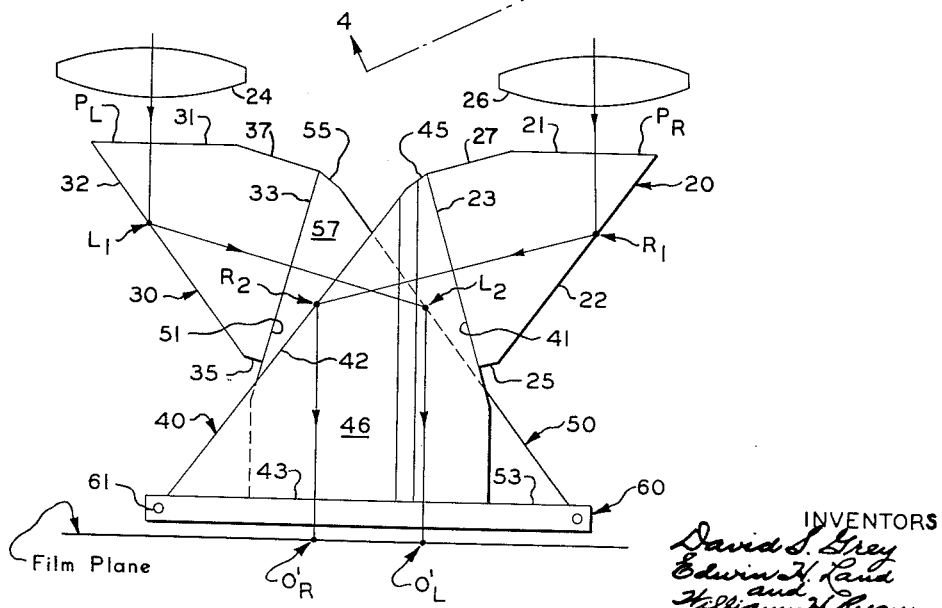
Figure 5:
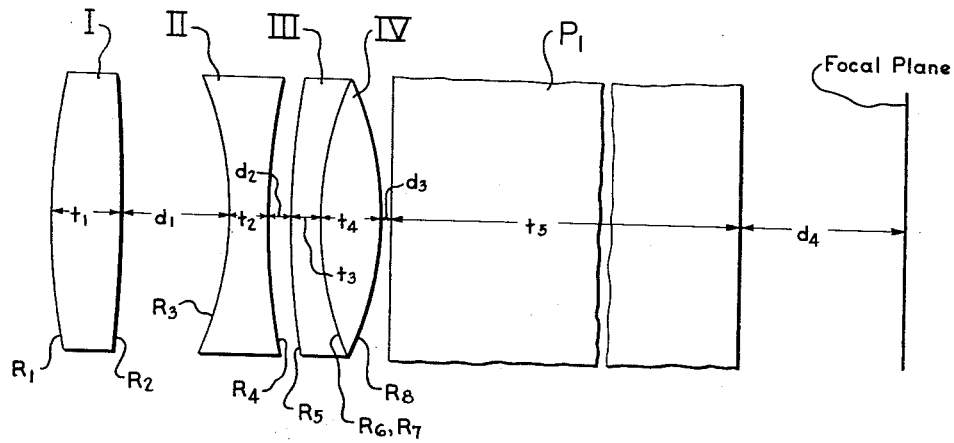
Figure 6:
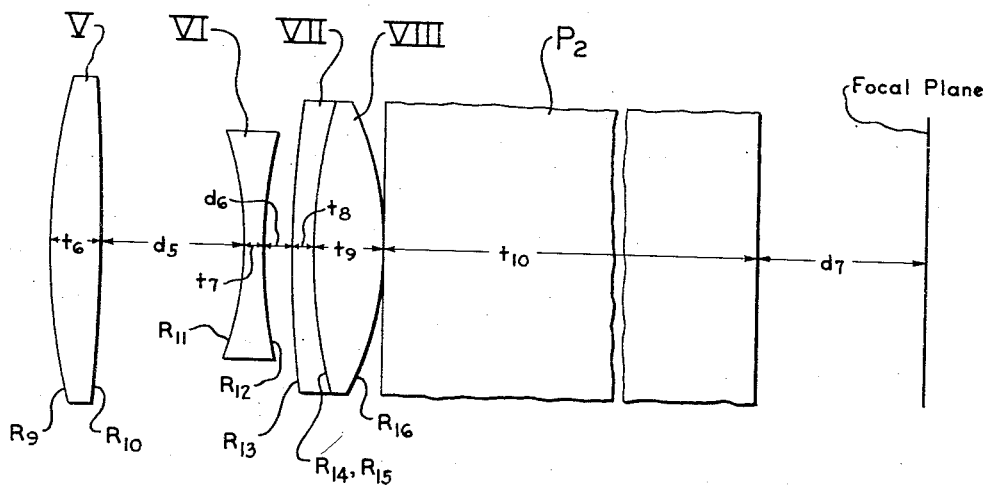
Figure 7:
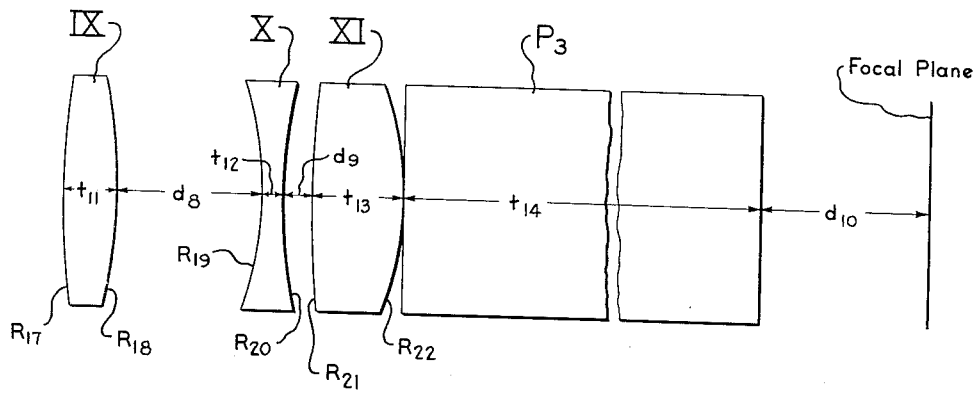

FIG. 4 illustrates the prism block of FIG. 3 when viewed from a plane which passes through the line 4—4 of FIG. 3 and which intercepts the film plane of FIG. 3 at right angles and schematically illustrates a septum for use in conjunction with camera apparatus with which the prism block is adapted to be associated; and FIGS. 5, 6 and 7 are each schematic views of three different embodiments of the lens-prism systems of the invention.

In optical instruments and installations, it is frequently desirable to provide for the displacement of the path of light transmitted through the system so that the path, instead of following a continuous straight line course, follows a course having at least two portions in the form of straight lines which are spaced apart in parallel relation. An example of path displacement of this nature is admirably illustrated in connection with a lens-prism system particularly designed for use in a camera for the purpose of taking stereoscopic pictures. The present invention will therefore be especially described in conjunction with a stereoscopic system comprising a pair of lens means and a pair of prism means for imaging an object on adjacent pairs of successive film frames of a photographic film mounted in camera apparatus which carries the pair of lens-prism systems. However, it will be obvious to those skilled in the art that the invention is not limited to camera use or to the formation of stereoscopic image pairs on a photographic film but will possess general utility in instances where light path displacement is required. In this regard the invention intends to employ a single lens-prism system or, as in the case of stereoscopic image formation, a pair of lens-prism systems which are spaced apart at a selected stereoscopic interpupillary separation. Furthermore, the invention is useful for the projection of a single image or a stereoscopic pair of images provided on films and the like.

In particular, the optical systems which will be described have been devised for use in cameras which employ photographic roll film, especially roll film of the type known as 35 mm. film. Additionally, the lens-prism systems are especially adapted for mounting on a body of a still camera, although they are equally effective for use with a motion picture camera. Furthermore, the optical systems of the invention are available for employment with film of sizes other than 35 mm.

An image which is rectangular and is of a nominal size equal to 24 mm. x 36 mm., with the long dimension of the rectangle parallel to the film length, is commonly produced on 35 mm. film. A film advance equal to a distance of about 38 mm. may be conveniently used for an image or picture of these dimensions. For an image of this size and shape, the most usual practice when making an exposure is to so orient or hold the camera that the images of vertical objects are approximately parallel to the short side of the image rectangle.

Optical systems with which this invention is concerned, for stereoscopic use, divide the just-mentioned 24 mm. x 36 mm. rectangular area into two equal rectangularly shaped frames each having dimensions of 24 mm. x 18 mm., with the long dimension of each rectangular frame extending transversely of the film and the centers of the frame areas separated by a distance of 18 mm. One of these small rectangular areas, which may be referred to as stereoscopic frames, is adapted to have a left-eye image; the other a right-eye image of a stereoscopic pair of images respectively formed therein. Stereoscopic frames of this nature permit the camera to be held or oriented by the previously-mentioned most common practice so that images of vertical objects will be approximately parallel to the short side of each frame.

The picture area in each stereoscopic frame preferably occupies the entire frame. Adjacent long edges of a stereoscopic image pair may even slightly overlap each other. This may, as will presently appear, be controlled by the use of a septum included in the optical system. However, the picture area in each frame may be somewhat less than the area of the frame whereby to leave a surrounding border. The first-mentioned arrangement wherein each image fills a frame in full is preferred as it facilitates the cutting of the developed film to separate the image pairs for placement in prepared picture mounts. Also, in the first-mentioned arrangement, the successive pairs of stereoscopic frames will be separated from each other by a distance of about one millimeter when a film advance of 38 millimeters and a frame size such as that described are employed.

By these arrangements, if the camera is held so that the stereoscopic interpupillary displacement of the system occurs along an approximately level line, then the images of level lines will lie in parallel relation to the long dimension of the 24 x 18 mm. rectangles which provide the stereoscopic image frames. To put it another way, if the camera is held so that the film is moved in a vertical direction, then horizontal lines of the object will be parallel to the long dimension of each picture area.

Figure 1:
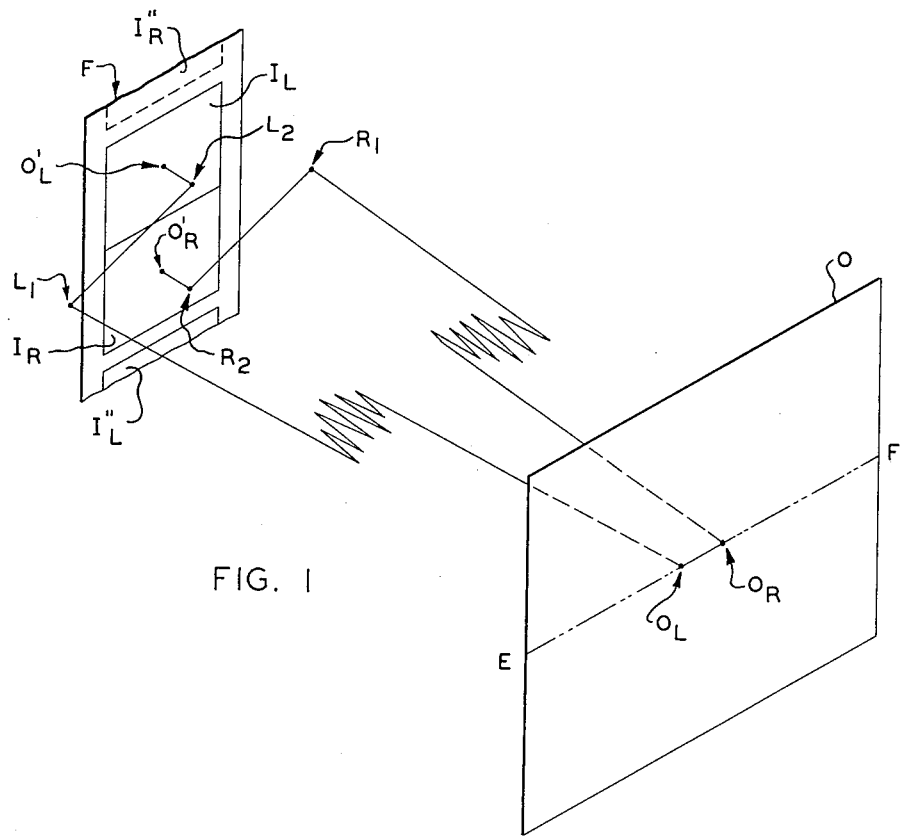
FIGURE 1 is a perspective view schematically showing the film plane, the object plane and the ray path therebetween for the lens-prism systems of this invention.

In FIG. 1 there is schematically shown a film F of the 35 mm. type having a portion which is located for exposure in the focal plane of a 35 mm. still camera and which comprises two stereoscopic frames with picture areas shown by the full line rectangles $I_L$ and $I_R$ adapted to respectively contain the left-eye and right-eye images of a stereoscopic pair.

As may be observed, the long dimension of the picture areas $I_L$ and $I_R$ extend transversely of the film while the short dimension thereof extends lengthwise of the film. Picture areas $I_L$ and $I_R$ are shown as adjoining each other. In this regard, the area at each stereoscopic frame will have dimensions of 18 mm. x 24 mm. in a preferred embodiment of the invention. $O'_L$ and $O'_R$ respectively indicate the centers of the stereoscopic frames as well as the centers of picture areas $I_L$ and $I_R$ which, in the disclosed illustration, are coincident with the frame centers and which, in the utilization of the just-described practice are separated by a distance of 18 mm. The individual stereoscopic frames are located successively lengthwise of the film and each film advance is adapted to move into exposure position a length of film equal to two stereoscopic frames. The dotted line portion $I''_R$ in FIG. 1 indicates a picture area in the unexposed right-eye frame of the pair of stereoscopic frames succeeding those located in the exposure position, while $I''_L$ indicates the left-eye picture area of a preceding exposed stereoscopic frame of the film.

Camera apparatus parts such as a magazine film spool; the wind-up spool; and the exposure frame of the camera which lies in the focal plane of the camera lens means and which has an aperture in that plane of the area necessary to provide the desired over-all dimensions for the 24 x 18 mm. frame areas containing the picture areas $I_L$ and $I_R$; as well as the specific optics used to form images in the picture areas are, for the purpose of simplification, omitted from FIG. 1 which diagrammatically traces the ray path of light transmitted through the optics employed for the formation of a stereoscopic pair of images in the areas $I_L$ and $I_R$.

In this regard, consider a ray of light perpendicular to the picture area $I_L$ of the film F and passing through the center $O'_L$ of the picture area. Such a ray of light is intended to be reflected by plane reflecting surfaces which are substantially parallel to each other at points $L_2$ and $L_1$ so that the ray will intersect an object plane at a point $O_L$. Similarly, a ray perpendicular to the center $O'_R$ of the picture area $I_R$ when reflected by plane reflecting surfaces which are parallel to each other at points $R_2$ and $R_1$ will intersect the object plane O at point $O_R$. Under these conditions, the line segments $O_LL_1$ and $O_RR_1$ will be parallel and hence coplanar. The plane containing these line segments will intersect the object plane O in a line EF. Assuming a lens is mounted in each line segment $O_LL_1$ and $O_RR_1$ so that its axis is coincident with the line segment with which it is associated and its focal plane is at the film plane, then points $O_L$ and $O_R$ in the object plane O will obviously represent the centers of the left- and right-eye views of the object plane when observed from the focal or film plane of a camera. If the lenses are located as described with the axes thereof perpendicular to the film and intercepting a straight line connecting points $L_1$ and $R_1$, then points $O_L$ and $O_R$ in the object plane may be brought into coincidence by adjusting the spacing between the lens axes. If the lenses are positioned in line segments other than $O_LL_1$ and $O_RR_1$, then similar arrangements can be made to effect the desired displacement just described. Thus the lens axes, instead of being reflected to the centers of their respective image frames, are preferably reflected downwardly to points slightly offset from the frame center along a level line in such a direction as to increase the displacement of the lens axes.

Mirrors or prism means are useful in carrying out the reflections in the light paths $O_LO'_L$ and $O_RO'_R$. Prism means are preferred and preferably comprise two prism units $P_L$ and $P_R$ detailed in FIGS. 3 and 4 and each consisting of a pair of prism elements 30, 50 and 20, 40, of which elements 30 and 50 are secured together by cement or the like, as is also the case with elements 20 and 40. Lens means are illustrated in conjunction with each prism unit for the purpose of forming the stereoscopic image pairs in the film plane and comprise a pair of objective elements 24 and 26 such for example as one of the types illustrated in FIGS. 5, 6 or 7. Each objective element of each pair is optically aligned with a prism unit $P_L$ or $P_R$ and located between the prism unit and the object plane O. In a preferred construction for stereoscopic use, prism units $P_L$ and $P_R$ are designed with two boundary faces which may be mounted in juxtaposed relation and secured together to provide a prism block. This is a feature of the invention which, in addition to a compact design, provides a structure which is easily mounted on the camera body.

While the invention has been illustrated as being carried out by a pair of prism units, it will be appreciated that the reflections may be omitted from one light path, for example the right-eye path, and the stereoscopic displacement of the lens axes achieved solely through reflections and displacements performed in the other light path, namely, the left-eye path.

It is however, within the scope of the invention to dispense with the block mounting and even to separately mount the individual prism elements of each prism unit $P_L$ and $P_R$. When the individual prism elements of the prism means are spaced from each other, the objective lens used with each prism set may be located between the spaced prism elements or between the object plane and the first prism element, or even between the image plane and the second prism element of the pair. The first prism 20 of the prism unit $P_R$, i.e., that prism nearest the objective lens, includes an entering face 21, a reflecting face 22, and an exit face 23 which is cemented to the entering face 41 of the second prism 40 of said unit $P_R$. Prism 40 also has a reflecting face 42 and an exit face 43. Prism unit or set $P_L$ which comprises secured together prisms 30 and 50 is similar to the unit $P_R$. The entering, reflecting and exit faces of prisms 30 and 50 are respectively indicated by reference numerals 31, 51; 32, 52; and 33, 53.

In the case of a stereoscopic camera it is desirable to employ a stereoscopic interpupillary distance or separation between the two optical systems of the camera which is smaller than the human interpupillary so that when the stereoscopic views which are produced on the film undergo projection a more correct rendition of the spatial relationships in the views will be obtained. Magnification, during projection of the planar images produced on the film, magnifies parallax differences between the left- and right-eye views whereby to cause distortion in instances where the interocular is large. For most snapshots, especially for close-up views, it is desirable to reduce the stereoscopic interpupillary distance so that when the picture is projected distortion is at a minimum or negligible. The use of a small interpupillary separation is facilitated in the present invention by a design wherein the individual optical means for each light path are arranged so that the angle between incident and reflected portions of the central ray of the bundle of rays transmitted through the optical means will be greater than 90°. For example, the angle between the line segment $O_LL_1$ and the line segment $L_1L_2$ is greater than 90° and similarly for portions of the central ray at other reflection points in the stereoscopic systems. Additionally, the employment of a small interpupillary distance lends itself to compact camera design.

The most compact design for the stereoscopic system is obtained if the smallest angle between any reflected ray and the lens axis before reflection of the ray is a right angle. However, if the smallest angle between the entering and reflecting face of any prism element which gives total internal reflection for all desired rays is larger than the angle which would give the most compact prism system, then such angle is preferred. The question of the most desired angle for a prism system wherein total internal reflection is desired will be influenced by such factors as the index of refraction of the prism material, the numerical aperture of the lens means associated with the prism, the field angle of said lens and other factors of this nature.

Figure 2:
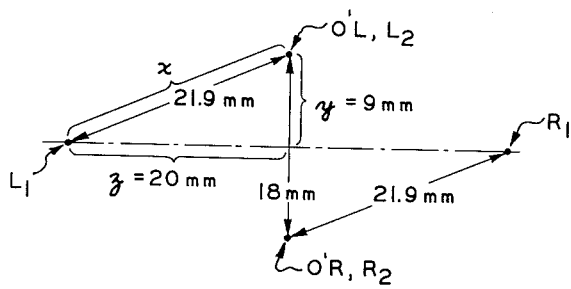
FIG. 2 is a schematic elevation of the ray path, as viewed in FIG. 1, from a direction looking toward the film plane.

The prism units are designed for a small stereoscopic interpupillary distance which in a preferred embodiment of the invention is equal to 40 mm. This interpupillary distance will give the separation between the light paths along the optical axes of the individual optical systems at reflection points $L_1$ and $R_1$. If, as shown in FIG. 2, a line connecting $L_1R_1$ is located in a horizontal plane, the centers $O'_L$ and $O'_R$ of the picture areas $I_L$ and $I_R$, as well as the second reflection points $L_2$ and $R_2$ in the optical axis, will be located 9 mm. above and below line $L_1R_1$ on a perpendicular which bisects said line. The distance between points $L_1$ and $L_2$ and $R_1$ and $R_2$, as well as the inclination to the horizontal of lines $L_1L_2$ and $R_1R_2$, is readily calculated.

The orientations of the segments $R_1R_2$ and $L_1L_2$ as well as the segments $R_2O'_R$ and $L_2O'_L$ of the light paths are therefore determined. Also the lengths of the segments $R_1R_2$ and $L_1L_2$ are determined. It is also known for the systems illustrated that the reflections at $R_1$ and $R_2$ are to be carried out by a pair of plane reflecting surfaces which are parallel, as is also the case for the reflections at points $L_1$ and $L_2$. It is apparent therefore that the reflecting faces 22 and 42 of the prism unit $P_R$ will be parallel to each other and also that the reflecting faces 32 and 52 of the prism unit $P_L$ will be parallel.

In the design of the prism units $P_R$ and $P_L$, the entering and reflecting faces of each prism 20 and 30 and the reflecting face and the exit face of each prism 40 and 50 are respectively inclined to each other by equal angles which are the smallest that permit total internal reflection of all of the rays which are to be reflected but which are not less than 45°. The angles discussed are equal so that the optical path may be displaced in each prism unit, as shown in the drawings, without being deflected. In the case of the lens systems hereinafter discussed, and with prism material having an index of refraction at least as high as 1.57, this angle is about 52° and in a preferred embodiment is substantially equal to 52.7°. This angle between the entering and reflecting faces of each prism is chosen so that the maximum ray transmitted by the lens means employed will undergo total internal reflection at two reflecting surfaces of each prism unit. Factors which determine this angle include the index of refraction of the prism material and the numerical aperture and field coverage of the lens used with the prism means.

It is also desirable in the design of the prism units to position the entering and exit faces of each prism so that they form an angle between them which is less than 90°. The angles between the entering and exit faces of the different prisms are equal to each other and, as one function, are selected to assist in eliminating or redirecting light which is falsely reflected off the interface between each prism pair 20, 40 and 30, 50. The redirection of this falsely reflected light is such that in general it is lost within each prism unit. The angle itself is chosen to reduce the angle of incidence of falsely reflected light. Additionally, if this angle is made as small as possible consistent with not interfering with the reflecting face of the second prism or the exit aperture of the first prism, then there will tend to be less vignetting within the prism block provided by joining two prism units together, that is to say, the left and the right prism units will tend less to interfere with each other for the passage of light.

As previously noted, the angles just discussed determine the inclination of the interfaces of the prisms of each unit with respect to normal incidence of the light path. In one preferred embodiment of the invention, the angle between the entering and exit faces for each prism is equal to 74.6°.

It has been indicated that it may be desirable to have the light paths from the centers of the image frames coincide in the object plane at some selected distance. Preferably this is achieved, as previously mentioned, by displacing the lens axes. Also, it is possible to achieve this condition by slight departures of the reflecting faces from parallelism or by slight departure of the transmitting prism faces from normal incidence with the transmitted light.

In the design of the prism units shown herein certain surface portions thereof which join the light-transmitting and light-reflecting surfaces are inclined to said surfaces for purposes such as controlling stray light or to cut down prism weight by removing excess material or to facilitate mounting of the units. For example, those portions of the reflecting faces of the prism pairs 20, 40 and 30, 50 which would be unused by the full aperture of the lens-prism system are cut away for the purpose of saving weight and providing compactness. A portion 27 and 37 of each of prisms 20 and 30 which is joined to the respective entering faces thereof are inclined to the entering faces for the purpose of trapping falsely directed light. These just-mentioned portions, which are indicated by the reference numerals 27 and 37, additionally serve to facilitate prism mounting, as is also the case of the bevel shown on the boundary faces 46 and 56 of the prisms 40 and 50. It may also be observed that the reflecting faces of each prism unit adjacent the interfaces of each prism pair have portions 25, 45 and 35, 55 which are inclined to said reflecting faces and which serve as light baffles for trapping light which originates outside of the field of view but which is directed into the prism units. As will be well understood, all outer surface portions of each prism unit with the exception of the light-transmitting and light-reflecting faces thereof are suitably ground and blackened.

As pointed out, the prism units of this invention are particularly suited for carrying out stereoscopic photography. Each of the prism units $P_R$ and $P_L$, substantially without change in shape from that described, may be designed so that the units are mountable in spaced-apart relation to each other. It is preferable, however, when two prism units are utilized, especially for stereoscopic purposes, to form the units into a prism block by securing adjacent boundary faces 47 and 57 of the large prisms 40 and 50 together. Such procedure not only facilitates mechanical mounting of the prism units but provides compactness for the prism structure as a whole and additionally avoids prism adjustments within the mount to obtain the desired interpupillary separation.

In the formation of the prism block, the boundary faces 47 and 57 may be secured together with an adhesive of a suitable index of refraction. It is possible for stray or other light to pass from the prism 40 of the prism block into the prism 50 thereof and vice versa. Such a condition is undesirable since light which enters one large prism from another may be transmitted through the system. To prevent this possibility the faces 46 and 56 are suitably coated with a substantially black and opaque paint or pigment or dye. Preferably the vehicle for the black and opaque material, which may be the adhesive or cement for securing the prism units into a block, is selected so that the index of refraction thereof is the same as the index of refraction for the prism material or so that it is slightly higher, as for example by .01.

For the purpose of convenience, consider a picture area of the film as the field served by the prism unit associated therewith and trace the light path from the film toward the object plane. For ideal conditions each prism unit should be able to accept and to transmit light from all points in its respective picture area or field. To carry out this ideal condition in a prism unit having the minimum required volume makes it necessary to employ a highly irregularly shaped mass. Such a prism unit would be difficult to manufacture and hence expensive. Additionally, it would be difficult if not impossible to form a prism block structure with two units of this irregular nature. Furthermore, two such irregular units would be difficult to mount in the lens-prism systems.

In the prism block structure, faces 46 and 56 provide outer boundary surfaces of the prism block while faces 47 and 57 provide the boundary surfaces which form the interface between the prisms 40 and 50 of the block. Boundary surfaces of this nature are to be distinguished from the working faces of the prisms which transmit or reflect light. The outer boundary surfaces 46 and 56 of the prisms 40 and 50 are not critical so that they may, as shown, be parallel and plane in the block structure. Also, in the prism block the boundary surfaces 46 and 56 may be separated by a spacing sufficient to prevent the interception of light which is to be transmitted through the prism units. However, plane boundary surfaces 47 and 57 in cases of systems whose aperture and field angle are even moderately large, would interfere with the desired volume for prism 50 and similarly for prism 40.

To minimize this interference, which causes vignetting of rays at the corner of the picture frames, it is desirable to position and arrange the boundary surfaces 47 and 57 so that when the prism units are assembled in the block structure the surfaces 47 and 57 will lie in planes which intersect the plane exit faces 43, 53 of said prisms 40 and 50 at a small angle to the intersections of the outer boundary surfaces 46 and 56 with said exit faces of said prisms. Such an angle by convenience is termed the "bias angle" and it permits positioning of the prism block so that, as shown in FIG. 3, the planes of the boundary surfaces 47 and 57 are angularly disposed to the transverse axis of the film F while the parallel boundary surfaces 46 and 56 are generally parallel to said transverse axis.

The "bias angle" is chosen so as to locate in the desired region the greatest volume of prism material for transmitting light which can be achieved from the utilization of interface boundary surfaces which lie substantially within single planes. As indicated, such an angle is small and will range from 5° to 14°. In a preferred embodiment of the invention, a bias angle of 8.8° has been found satisfactory. Certain factors, such as the interpupillary distance selected, the index of the prism material, the lens aperture and the like will influence the size of the bias angle which, in all events, as indicated above, will be relatively small.

The bias angle has been described with reference to the angularity, in the plane of the exit faces 43 and 53, between the prism block interface boundary surfaces 47 and 57 and the boundary surfaces 46 and 56 of the prisms 40 and 50. If the boundary surfaces 46 and 56 lie in parallel planes, as is usually the case, it will be apparent that the bias angle may also be related to the transverse axis of the film when the prism block is arranged so that the planes of the boundary surfaces 46 and 56 intersect the film in lines which are parallel to the transverse axis thereof. Hence, the bias angle may also be defined as that angle which the plane of the interface of the prism block structure at the secured together boundary surfaces 47 and 57 makes with the transverse axis of a film located in the film plane. It may also be noted that if a plane is passed through the reflection points $L_1$ and $R_1$, which are spaced apart by the desired stereoscopic interpupillary distance, and if this plane is perpendicular to the longitudinal axis of film in the film plane, then the plane which includes $L_1$ and $L_2$ will intersect said film in a line which is parallel to the transverse axis of the film. Thus, the bias angle may also be related to a plane which includes the optical axes of the lenses of a stereoscopic system and which is parallel to the longitudinal axis of the film.

As previously pointed out, it is generally desirable to associate a septum with the prism block. The only means for preventing the images formed in the film plane from spreading over each other are the edges of the prisms 40 and 50 at their block interface at the bias angle, assuming that no septum is employed. Since the images formed in the film plane in the stereoscopic frames are intended to essentially abut each other and since the edges of the large prisms 40 and 50 at the bias angle are spaced by a few millimeters from the film plane, it is apparent that these edges of the large prisms cannot be relied upon to sharply terminate the left- and right-eye pictures at the boundary line between two stereoscopic frames.

It is therefore desirable, for controlling the overlap between image pairs, to use a septum which is supported at the exit faces of the prism block. This septum has its base in contact with the exit faces of the large prisms of the blocks and is shaped so that the base completely overlies the junction between the two large prisms at their exit faces while the opposite edge of the septum extends in a direction which is substantially at right angles to the longitudinal axis of the film in the film plane.

A septum 60 of this general nature is schematically shown in FIG. 4. Septum 60 is disclosed as having openings or holes 61 at its extremities for the purpose of fastening it to the camera casing or optics housing or other part of the camera. As illustrated, the septum is intended to extend entirely across the exit faces of the two large prisms 40 and 50 of the prism block.

Certain preferred conditions exist in the selection of the optical materials for the prism elements. For example, yellow glass, i.e., blue absorbing glass, should not in general be employed when the prism systems are used in a camera. Additionally, the material for the prisms should have a high index of refraction and a low dispersion (or a high nu value). The higher the index of refraction, the shorter will be the path through the prisms. This leads to compact design and is desirable.

One factor affecting the path length through a prism unit resides in the lens associated with said unit and particularly in the size of the exit pupil of said lens in the direction in which the lens axis is displaced. The exit pupil of the lens may be as large as desired in a direction which is perpendicular to that direction in which the lens axis is displaced. For obtaining a short glass path through a prism unit, it therefore is unnecessary for the exit pupil of the lens to be circular.

The higher the nu value of the optical materials for the prisms, the easier it is to correct each lens-prism system as a whole, especially for chromatic aberration. In general, as the index of refraction of optical glass increases, the dispersion thereof tends to increase and one gets into yellow or blue absorbing glass. The glass for the prisms should be selected to best meet the requirements indicated.

The minimum refractive index acceptable for a prism unit depends on such factors as the focal length of the lens employed therewith as well as the numerical aperture of said lens, the amount of vignetting to be tolerated, the stereoscopic interpupillary distance employed, the separation of the prism unit from the film plane and similar factors. For the lens-prism systems illustrated, a refractive index for the prism material of at least as high as 1.6 is desirable. The same optical materials may be used for each prism of a prism unit.

In certain instances, it is simple to place a prism between a lens and the image plane of said lens. This invention is concerned with cases wherein the length of the light path through the prism tends to consume all of the back focal length of the lens. The invention utilizes a prism design which tends to minimize the light path therethrough and a lens which tends to maximize the back focus. For example, the invention intends to employ a prism unit having a path length therethrough which is greater than 90% of the focal length of the lens associated therewith. Thus the invention is concerned with lens-prism systems wherein the sum of the path length through the prism unit divided by the index of refraction of the prism material plus the length of the light path in air between the lens and the prism unit and the film plane and the prism unit is greater than 75% of the focal length of the lens.

It is also desirable to establish limits for the sizes of the prisms of a unit. In this regard the ratio of the length of the light path through the first prism of the unit, i.e., prims 20 or 30, to the length of the light path through the second prism, i.e., prism 40 or 50, should be less than .8. It will be evident from this that the second prism is therefore larger than the first one. The maintenance of such a relationship leads to compactness of design but is dependent on the numerical aperture and field angle of the lens associated with the prism unit. Thus, the ratio between the path lengths through the elements of the prism unit will increase as the numerical aperature of the lens used with the prism unit increases while the ratio decreases as the field angle of the lens increases.

Any suitable objective may be utilized with the prism units shown in this invention. A preferred type of objective lens has been illustrated in the form of a triplet as comprising at least three optical components or lens groups located on the object side of the prism unit for directing light into the prism unit for passage therethrough. The objectives herein are designed to have an exceptionally long back focus which is longer than the back focus of at least most conventional lenses used in connection with prism means of a character having a long light path therethrough. Such a long back focus is desirable to give room for the prism unit and to permit a sufficient air space between the prism unit and the film plane. The triplet itself comprises a positive front component, i.e., the lens component nearest the object plane, a negative intermediate component and a positive back component, i.e., the lens component located nearest to the prism unit. All lens components of the objective may comprise single lens elements or the front and intermediate lens components of the objective may each be a single element and the back lens a doublet. The triplet itself comprises a positive front lens, i.e., the lens nearest the object plane, a negative intermediate lens and a positive back lens, i.e., the lens located nearest to the prism unit.

In all designs, each objective lens functions to correct the prism unit with which it is associated, especially for astigmatism, distortion and chromatic aberration. By themselves, the lenses are not well corrected but, when combined with the prisms of a unit, produce a lens-prism system which is corrected for spherical aberration, chromatic aberration, coma, astigmatism, curvature of field, distortion and the like.

From the foregoing it will be apparent that the objective lens used with a prism unit possesses certain general features. For example, in a lens system of the character described, the front element of the objective may be advantageously designed to provide certain special corrections. In this regard, the front lens element is preferably formed of light-transmitting material having a nu value at least as low as 45 to assist in correcting lateral color introduced into the system by the prism unit. Also the back surface of the front element of the objective should have a curvature such that the radius thereof divided by the focal length of the front lens is less than 8. This requires a relatively high curvature for the back surface of the front lens and is primarily utilized to correct the lens-prism system for astigmatism.

Lateral color introduced by the prism unit into the image may be further corrected by designing the objective so that the front lens element thereof appropriately converges an axial bundle of light rays prior to incidence at the intermediate lens thereof. Such convergence may be in general effected by utilizing a separation between the front and intermediate lens elements of the objective such that said separation, when multiplied by the quotient of the power of the front lens divided by the nu value of the front lens is greater than 0.005. More precisely, this relationship for obtaining the desired convergence is dependent upon the separation between the second principal point of the front lens component and the first principal point of the intermediate lens component and may be precisely expressed as being obtained when the distance between the second principal point of the front lens component and the first principal point of the intermediate lens component divided by the product of the focal length and the nu value of the front lens component is greater than 0.005.

It may be observed from the just foregoing that the front lens of the objectives featured herein is bent further forward than in conventional triplets whereby to compensate for distortion and astigmatism introduced into the system by the prism unit. However, when this is done, coma is introduced into the lens system. It is therefore generally desirable to bend the intermediate lens forward. Such practice is carried out by utilizing curvatures for the back and front surfaces of the intermediate lens such that the raio of the radius of curvature of the back surface of the intermediate lens to the radius of curvature of the front surface thereof is greater than 1.

Preferably, the distance in air between the prism unit and the film plane should be as great as possible while the distance between the black element of the objective lens and the prism unit should be as small as possible including contact of the back lens with the prism unit. In this regard, there is the problem of keeping the prisms as far away as possible from the film plane so that dust on a prism face next to the film or an air bubble in such face will not cast a shadow upon the film. Furthermore, the farther away the exit face of the prism unit is located from the film plane the smaller will be the prism if, as is generally the case, the lens aperture is smaller than the image area. The smaller the prism unit the less the light lost by absorption.

FIGS. 5, 6 and 7 of the drawings illustrate specific examples of lens-prism systems utilizing the features and details heretofore discussed and incorporate the same in all embodiments which form the subject of specific illustration.

With reference to FIG. 5 there is schematically shown in in side elevation a lens-prism system utilizing a prism unit $P_1$ similar to either of the units $P_R$ or $P_L$ of FIGS. 3 and 4 and employing a three-component objective having a single front element I, a single intermediate element II and a back component in the form of a cemented doublet which comprises the lens elements III and IV. In this embodiment of the invention the back element IV is slightly separated from the prism unit $P_R$ by a spacing of 1.0 mm.

Table I below gives the constructional data with dimensions in millimeters for the specific example of the lens-prism system illustrated in FIG. 5 for a lens having a focal length of 100 mm. and an aperture of $f/4$.

Table I
[$f/4$    Focal length 100]

| Element | Radius | Spacing and Thickness | $N_D$ | V |
|---|---|---|---|---|
| I | $R_1=+64.5$ | $t_1=7.0$ | 1.66 | 35.7 |
|   | $R_2=-153.8$ | $d_1=10.9$ |  |  |
| II | $R_3=-32.95$ | $t_2=4.0$ | 1.59 | 39.0 |
|    | $R_4=+65.36$ | $d_2=2.33$ |  |  |
| III | $R_5=+76.90$ | $t_3=3.0$ | 1.61 | 37.0 |
|     | $R_6=+33.33$ |  |  |  |
| IV | $R_7=+33.33$ | $t_4=6.0$ | 1.611 | 58.8 |
|    | $R_8=-31.33$ | $d_3=1.0$ |  |  |
| $P_1$ |  | $t_5=109.0$ | 1.617 | 49.8 |
|       |  | $d_4=16.6$ |  |  |

In FIG. 6 there is schematically shown in side elevation another embodiment of a lens-prism system utilizing a prism unit $P_2$ similar to either of the units $P_R$ or $P_L$ of FIGS. 3 and 4 and employing a three-component objective having elements V through VIII provided with a back component which is a doublet. It may be noted that by this design the back element of the objective is in contact with the front entrance face of the prism $P_2$.

Table II gives the constructional data with dimensions in millimeters for the specific example of the lens-prism system illustrated in FIG. 6 and including a lens having a focal length of 100 mm. and an aperture of $f/4$.

Table II
[$f/4$    Focal length 100]

| Element | Radius | Spacing and Thickness | $N_D$ | V |
|---|---|---|---|---|
| V | $R_9=+62.5$ | $t_6=5.0$ | 1.65 | 38.4 |
|   | $R_{10}=-250.00$ | $d_5=14.675$ |  |  |
| VI | $R_{11}=-32.575$ | $t_7=2.0$ | 1.621 | 36.2 |
|    | $R_{12}=+48.775$ | $d_6=3.0$ |  |  |
| VII | $R_{13}=+105.275$ | $t_8=2.0$ | 1.617 | 36.6 |
|     | $R_{14}=+52.625$ |  |  |  |
| VIII | $R_{15}=+52.625$ | $t_9=7.0$ | 1.611 | 58.8 |
|      | $R_{16}=-31.475$ |  |  |  |
| $P_2$ |  | $t_{10}=111.0$ | 1.617 | 53.9 |
|       |  | $d_7=17.0$ |  |  |

FIG. 7 schematically shows, in side elevation, another embodiment of a lens-prism system utilizing a prism unit $P_3$ similar to either of the units $P_R P_L$ of FIGS. 3 and 4 and employing a three-component objective having all of the elements thereof in the form of single lenses IX, X and XI. As in the lens-prism system of FIG. 6, the back element XI of the objective illustrated in FIG. 7 is in contact with the front entrance face of the prism $P_3$.

Table III gives the constructional data with dimensions in millimeters for the specific example of the lens-prism system illustrated in FIG. 7 and including a lens having a focal length of 100 mm. and an aperture of $f/3.5$.

Table III
[$f/3.5$    Focal Length 100]

| Element | Radius | Spacing and Thickness | $N_D$ | V |
|---|---|---|---|---|
| IX | $R_{17}=+78.125$ | $t_{11}=5.26$ | 1.8804 | 41.1 |
|    | $R_{18}=-517.0$ | $d_8=14.67$ |  |  |
| X | $R_{19}=-34.01$ | $t_{12}=2.0$ | 1.649 | 33.8 |
|   | $R_{20}=+51.04$ | $d_9=3.0$ |  |  |
| XI | $R_{21}=+105.3$ | $t_{13}=9.0$ | 1.611 | 58.8 |
|    | $R_{22}=-30.55$ |  |  |  |
| $P_3$ |  | $t_{14}=111.0$ | 1.6109 | 57.2 |
|       |  | $d_{10}=16.8$ |  |  |

While the invention has been specifically described in connection with optical systems which employ prism means to effect a displacement of the light path through the system, it will be well understood that the objective lenses themselves are available for use with optical means of a nature which transmit light therethrough without changing the direction of the light path. One example of such a system comprises an objective lens and a light-transmitting optical element in the form of a block of optical glass or other optical medium having an index of refraction substantially greater than air and provided with entering and exit faces which are parallel to each other and which are arranged in the system so that they are perpendicular to the optical axis of the objective lens. In instances where it is desirable to lengthen the mechanical distance from the lens to the focal plane, a glass block of the character just described is advantageous. As one specific example, the employment of a glass block of this character is useful in stereoscopic systems of a nature employing a pair of similar objectives but wherein the stereoscopic displacement of the axes of the system is achieved solely through reflections and displacements performed in one light path only.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A stereoscopic lens-prism optical system providing at an image plane a stereoscopic pair of images of a photographic subject which are displaced in a direction substantially at 90° to the direction of stereoscopic displacement existing between portions of said subject due to parallax, and providing maximum transmission of functional light rays and substantial elimination of non-functional light rays, said system comprising a pair of narrowly horizontally spaced objectives, a prism block including a pair of substantially identical compound prism units, each prism unit being composed of a pair of generally triangular prism elements having a joined interface forming an acute angle with the vertical, a first prism element of each said pair having an entrance face substantially normal to an optical axis of said objectives, a reflecting face forming an acute angle of at least 45° with its entrance face and providing total reflection of functional light rays at an angle greater than 90°, and an exit face constituting one face of said interface and forming an acute angle of at least 45° with the reflecting face of said first prism element and an angle of less than 90° with its entrance face, and a second prism element of each said pair having an entrance face constituting the other face of said interface, a reflecting face forming an acute angle of at least 45° with its entrance face and providing total reflection of functional light rays at an angle greater than 90°, and an exit face forming an acute angle of at least 45° with its reflecting face and an angle of less than 90° with its entrance face, the entrance face of the first prism element and the exit face of the second prism element of each said prism unit pair being substantially parallel and the second prism elements of said prism unit pairs being joined at an interface disposed at an acute angle of between 5 and 14° to the horizontal, the first prism elements of said prism unit pairs being relatively narrowly horizontally spaced and optically aligned with said objectives, which are located externally of said prism block, to provide a small stereoscopic interpupillary distance and the second prism elements of said prism unit pairs being relatively vertically positioned as determined by the plane of said last-named angularly disposed interface therebetween.

2. A stereoscopic lens-prism optical system, as defined in claim 1, wherein the angle between the entrance and exit faces of each prism element of the pair of elements constituting a prism unit is less than 90°.

3. A stereoscopic lens-prism optical system, as defined in claim 1, wherein the interface of said second prism elements of each said prism unit pair is disposed at said acute angle with respect to a plane which includes the optical axes of said objectives.

References Cited in the file of this patent

UNITED STATES PATENTS

| | | |
|---|---|---|
| 840,378 | Salow | Jan. 1, 1907 |
| 862,354 | Stevens | Aug. 6, 1907 |
| 1,095,932 | Schutz | May 5, 1914 |
| 1,454,218 | Folmer | May 8, 1923 |
| 1,719,443 | Nichterlein | July 2, 1929 |
| 1,729,617 | Kelly et al. | Oct. 1, 1929 |
| 1,795,092 | Moller | Mar. 3, 1931 |
| 1,815,208 | Moraz | July 21, 1931 |
| 1,851,317 | Lihotzky | Mar. 29, 1932 |
| 1,851,705 | Herz | Mar. 29, 1932 |
| 1,900,241 | Konig | Mar. 7, 1933 |
| 1,909,222 | Pettie | May 16, 1933 |
| 1,964,968 | Warmisham | July 3, 1934 |
| 2,015,527 | Konig | Sept. 24, 1935 |
| 2,027,675 | Callier et al. | Jan. 14, 1936 |
| 2,096,425 | Dixon et al. | Oct. 19, 1937 |
| 2,168,273 | Sauer et al. | Aug. 1, 1939 |
| 2,240,728 | Vierling et al. | May 6, 1941 |
| 2,314,174 | Steinman | Mar. 16, 1943 |
| 2,352,026 | Smejkal | June 20, 1944 |
| 2,434,378 | Wekeman | Jan. 13, 1948 |
| 2,541,014 | Orser | Feb. 13, 1951 |
| 2,559,881 | Kingslake et al. | July 10, 1951 |
| 2,729,138 | Bernier | Jan. 3, 1956 |

FOREIGN PATENTS

| | | |
|---|---|---|
| 789,755 | France | Aug. 26, 1935 |
| 810,769 | France | Jan. 6, 1937 |
| 892,759 | France | Jan. 13, 1944 |
| 56,706 | Netherlands | July 15, 1944 |
| 300,077 | Italy | Aug. 27, 1932 |
| 385,623 | Great Britain | Jan. 2, 1933 |

OTHER REFERENCES

Ser. No. 254,738, Vierling et al. (A.P.C.), published May 4, 1943.